(12) United States Patent
Len et al.

(10) Patent No.: US 8,305,425 B2
(45) Date of Patent: Nov. 6, 2012

(54) SOLID-STATE PANORAMIC IMAGE CAPTURE APPARATUS

(75) Inventors: Mei Len, San Jose, CA (US); Chin-Hai Chang, Hsinchu (TW)

(73) Assignee: Promos Technologies, Inc., Hsinchu (TW)

( * ) Notice: Subject to any disclaimer, the term of this patent is extended or adjusted under 35 U.S.C. 154(b) by 705 days.

(21) Appl. No.: 12/545,296

(22) Filed: Aug. 21, 2009

(65) Prior Publication Data

US 2010/0045774 A1 Feb. 25, 2010

Related U.S. Application Data

(60) Provisional application No. 61/091,040, filed on Aug. 22, 2008.

(51) Int. Cl.
*H04N 7/00* (2006.01)
*G02B 13/06* (2006.01)

(52) U.S. Cl. ... 348/36; 348/42; 348/E5.03; 348/E7.003; 348/E13.015; 359/725

(58) Field of Classification Search .......... 348/36, 348/42, E13.015, E5.03, E7.003; 359/725
See application file for complete search history.

(56) References Cited

U.S. PATENT DOCUMENTS

| | | | | |
|---|---|---|---|---|
| 4,994,670 A * | 2/1991 | Noble et al. | | 250/235 |
| 5,495,576 A * | 2/1996 | Ritchey | | 345/420 |
| 5,539,483 A | 7/1996 | Nalwa | | |
| 5,657,073 A * | 8/1997 | Henley | | 348/38 |
| 6,018,403 A * | 1/2000 | Shirakura et al. | | 359/23 |
| 6,175,454 B1 | 1/2001 | Hoogland et al. | | |
| 6,314,064 B1 * | 11/2001 | Ueda et al. | | 369/44.23 |
| 6,449,103 B1 * | 9/2002 | Charles | | 359/725 |
| 6,545,702 B1 * | 4/2003 | Konolige et al. | | 348/36 |
| 6,560,413 B1 | 5/2003 | Lee | | |
| 6,593,969 B1 * | 7/2003 | Driscoll, Jr. et al. | | 348/335 |
| 7,262,789 B2 * | 8/2007 | Jones | | 348/36 |
| 7,649,690 B2 * | 1/2010 | Simkulet et al. | | 359/627 |
| 8,110,791 B2 * | 2/2012 | Laycock et al. | | 250/227.2 |
| 2002/0147991 A1 * | 10/2002 | Furlan et al. | | 725/135 |
| 2004/0001138 A1 * | 1/2004 | Weerashinghe et al. | | 348/36 |
| 2004/0057622 A1 * | 3/2004 | Bradski | | 382/217 |
| 2004/0159770 A1 * | 8/2004 | Takiguchi et al. | | 250/201.4 |
| 2004/0233274 A1 * | 11/2004 | Uyttendaele et al. | | 348/36 |
| 2004/0246333 A1 * | 12/2004 | Steuart, III | | 348/36 |
| 2005/0013022 A1 | 1/2005 | Rondinelli | | |
| 2005/0030527 A1 * | 2/2005 | Reinhorn | | 356/237.1 |

(Continued)

FOREIGN PATENT DOCUMENTS

CA 2 335 657 A1 7/2002

(Continued)

*Primary Examiner* — Alina N. Boutah (74) *Attorney, Agent, or Firm* — Finnegan, Henderson, Farabow, Garrett & Dunner, LLP (57) ABSTRACT

A panoramic camera system is disclosed that includes an unified optical system, an image capture device, and a processing unit. The unified optical system may include a first set of lenses that guide images received from horizontal directions of a target scene that surrounds the unified optical system. The unified optical system may also include a deflecting device that deflects the images guided through the first set of lenses and a second set of lenses that projects the images deflected by the deflecting device. The image capture device collects the projected images into a determined pattern based on the second set of lenses. Moreover, the processing unit processes the collected images from the image capture device to generate at least one of image signals and video signals representing a panoramic rendition of the target scene.

28 Claims, 7 Drawing Sheets

U.S. PATENT DOCUMENTS

| | | | |
|---|---|---|---|
| 2005/0062869 A1* | 3/2005 | Zimmermann et al. | 348/335 |
| 2005/0068632 A1* | 3/2005 | Holloway et al. | 359/619 |
| 2005/0094286 A1* | 5/2005 | Mizuguchi | 359/680 |
| 2005/0117015 A1 | 6/2005 | Cutler | |
| 2005/0209012 A1* | 9/2005 | Jouppi | 472/57 |
| 2006/0023106 A1 | 2/2006 | Yee et al. | |
| 2006/0105299 A1* | 5/2006 | Ferris et al. | 434/11 |
| 2006/0140104 A1* | 6/2006 | Yamamoto et al. | 369/112.23 |
| 2006/0256674 A1* | 11/2006 | Ikenaka et al. | 369/44.37 |
| 2008/0024793 A1* | 1/2008 | Gladnick | 356/603 |
| 2008/0036875 A1* | 2/2008 | Jones et al. | 348/222.1 |
| 2008/0050011 A1* | 2/2008 | Ofek et al. | 382/154 |
| 2008/0123184 A1* | 5/2008 | Hege et al. | 359/383 |
| 2008/0247061 A1* | 10/2008 | Simkulet et al. | 359/730 |
| 2009/0073256 A1* | 3/2009 | Steuart, III | 348/36 |
| 2009/0113505 A1* | 4/2009 | Yu | 725/114 |
| 2010/0097526 A1* | 4/2010 | Jacob | 348/578 |
| 2011/0032325 A1* | 2/2011 | Harris | 348/36 |

FOREIGN PATENT DOCUMENTS

| | | |
|---|---|---|
| GB | 2 423 156 A | 8/2006 |
| JP | 2007-101662 | 4/2007 |
| WO | WO 2004/051340 A1 | 6/2004 |
| WO | WO 2005/106543 A1 | 11/2005 |
| WO | WO 2006/093387 A1 | 9/2006 |

* cited by examiner

SOLID-STATE PANORAMIC IMAGE CAPTURE APPARATUS

RELATED APPLICATION

This application claims priority to U.S. Provisional Patent Application No. 60/091,040 filed on Aug. 22, 2008, entitled SOLID-STATE PANORAMIC VIDEO CAPTURE APPARATUS by Mei Len, and is herein incorporated by reference in its entirety.

BACKGROUND

This application relates to imaging systems, and in particular to a panoramic camera system that provides a high precision extended field of view.

The usefulness and popularity of imaging systems have steadily grown in the wake of technological advances in image processing and material design. A panoramic camera is one type of imaging system that collects a panoramic view of a scene in a single snap shot Panoramic cameras have use in surveillance, video conferencing, automotive, and machine vision technologies. Moreover, consumer panoramic photography is becoming a popular form of artistic expression.

To address the growing need for such imaging systems, many panoramic image capture systems have evolved. Although these different technologies provide for panoramic image capture, they do so at the expense of accuracy, clarity, and cost.

For instance, Canadian patent no. CA2335657A1 and international publication no. WO2006/093387A1 disclose panoramic systems that collect images using multiple cameras positioned in different locations. Unfortunately, the multiple cameras increase the complexity and cost of the imaging systems, thus rendering them unfeasible for most applications. Compounding this problem, some imaging systems have been designed that employ multiple reflective mirrors and cameras to collect panoramic images. U.S. Pat. Nos. 5,539,483 and 6,560,413, and U.S. published patent applications US2005/0117015 and US2006/0023106 disclose these types of systems. Because these systems use multiple cameras in connection with multiple mirrors, the complexity and cost of their design make them unattractive options for consumer applications. Moreover, these types of imaging systems are unable to capture images from the top side of the system.

Figure 1:
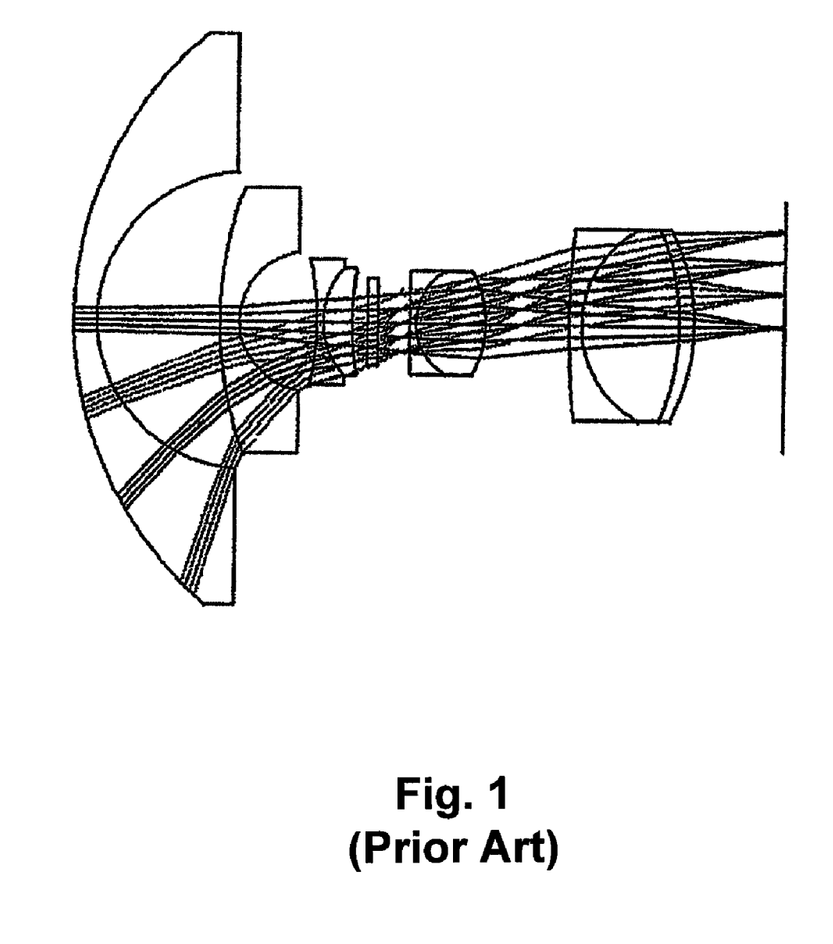
FIG. 1 is a block diagram of a conventional fisheye type panorama camera design.

Other imaging systems have been designed that provide panoramic views without using multiple cameras. For example, FIG. 1 shows a conventional fisheye type panorama camera that uses multiple lenses to direct images to a receiving area. However, because less information and Modular Transfer Function (MTF) are allocated to the border areas of the lenses, which provide the more distant scenes of a captured image, the fisheye camera produces distorted images. And while implementing high resolution image sensors may reduce the distortion effects produced by the lenses, such implementations would increase the cost of the system rendering it less feasible option for most applications.

Additional imaging systems implement mirrors aligned to an image capture device. U.S. published patent application US 2005/0013022 and Great Britain patent no. GB2423156 disclose such designs. These types of systems use a single curvilinear mirror aligned to an image capture device. However, these systems also produce distorted images because less information and worse MTF are allocated to a center area that is reserved for capturing information for near scenes. Moreover, these designs produce a blind spot where the mirror is fixed to the system. Similar to the fisheye design, higher resolution image sensors may be employed to reduce the distortion caused by the design, but such implementations would increase the cost of the system.

A variation to the single curvilinear mirror design is shown in international publication no. WO2004051340 and U.S. Pat. No. 6,175,454. These designs include a panorama camera system that uses multiple curvilinear mirrors and lenses aligned to an image capture device. Unfortunately, as with other conventional mirror designs, these systems also produce distorted images because less information is allocated to a center area that maintains information for far scenes of a captured image. Further, these multiple curvilinear designs also fail to capture scenes from the top side of the system. Also, while higher resolution image sensors may be employed to reduce the distortion caused by the design, such implementations would increase the cost of the system.

To address the top side view deficiencies of the above described multiple curvilinear mirror designs, panorama camera systems have been designed to include multiple curvilinear mirrors and lenses at the top side of the systems. International publication no. WO2005106543 describes such a system. And though this design may provide wider fields of view than single camera designs, the image generated has discrete distortion between, and at, the center and borders of the image. Moreover, the image processing that is required to compensate for the distortion and to stitch the top and side views together may be difficult to implement.

Other forms of panorama camera systems include Japanese patent no. JP2007101662 that discloses a panorama camera system using a rolling iris, lens set, curved shape image sensor, a mechanical control unit, and an image processing unit. The rolling iris scans the scene and the image sensor captures stripes of the collected images to produce a panoramic view of the scene. However, the mechanical parts necessary to perform the image capture disclosed in this patent increase the cost and decrease reliability of the system. Moreover, it may be difficult to mass produce the curved shaped image sensor using main stream semiconductor technologies.

Accordingly, there is a need for a low cost panoramic camera design that is more robust and stable, has a wider view angle, provides a smaller form factor, and provides less distortion than conventional panoramic camera systems.

SUMMARY OF THE INVENTION

To address the disadvantages of the conventional imaging systems discussed above, a panoramic camera system is disclosed that includes, in one embodiment, an unified optical system, an image capture device, and a processing unit. The unified optical system may include a first set of lenses that guide images received from horizontal directions of a target scene that surrounds the unified optical system. The unified optical system may also include a deflecting device that deflects the images guided through the first set of lenses and a second set of lenses that projects the images deflected by the deflecting device. The image capture device collects the projected images into a determined pattern based on the second set of lenses. Moreover, the processing unit processes the collected images from the image capture device to generate at least one of image signals and video signals representing a panoramic rendition of the target scene.

In another embodiment, an optical system for a panoramic camera system is disclosed that includes a first set of lenses arranged to guide images from different directions of a target scene such that the first set of lenses guide images from a 360 degree field of view of the target scene. The optical system may also include a deflecting device that deflects the guided images from the different directions in a downward direction. Further, the optical system may include a second set of lenses configured to receive the deflected images from the deflecting device and to project the deflected images to an image capture device in a pattern based on an arrangement of the second set of lenses.

In yet another embodiment, a panoramic imaging system is disclosed that includes first means for guiding images from different directions of a target scene such images are guided from a 360 degree field of view of the target scene. The imaging system may also include deflecting means for deflecting the images guided by the first means and second means for projecting the images deflected by the deflecting means. Moreover, the imaging system may include third means for collecting the projected images into a determined pattern based on the second means. Fourth means processes the collected images from the third means to generate at least one of image signals and video signals representing a panoramic rendition of the target scene.

In another embodiment, a method for providing a panoramic image of a target scene that surrounds a panoramic camera system in a 360 degree field of view is disclosed. The method may include guiding images received from horizontal directions of the target scene through a set of horizontal lenses. The method may further include providing the guided images to a set of eyepiece lenses and projecting the guided images through the set of eyepiece lenses to an image capture device. Moreover, the method may include synchronously collecting the projected images into a determined pattern on the image capture device based on the set of eyepiece lenses and processing the collected images to generate at least one of image signals and video signals representing a panoramic rendition of the target scene.

It is to be understood that both the foregoing general description and the following detailed description are exemplary and explanatory only and are not restrictive of the embodiments of the invention as claimed.

DETAILED DESCRIPTION OF THE EMBODIMENTS

Reference will now be made in detail to exemplary aspects of the present invention, examples of which are illustrated in the accompanying drawings. Wherever possible, the same reference numbers will be used throughout the drawings to refer to the same or like parts.

Figure 2:
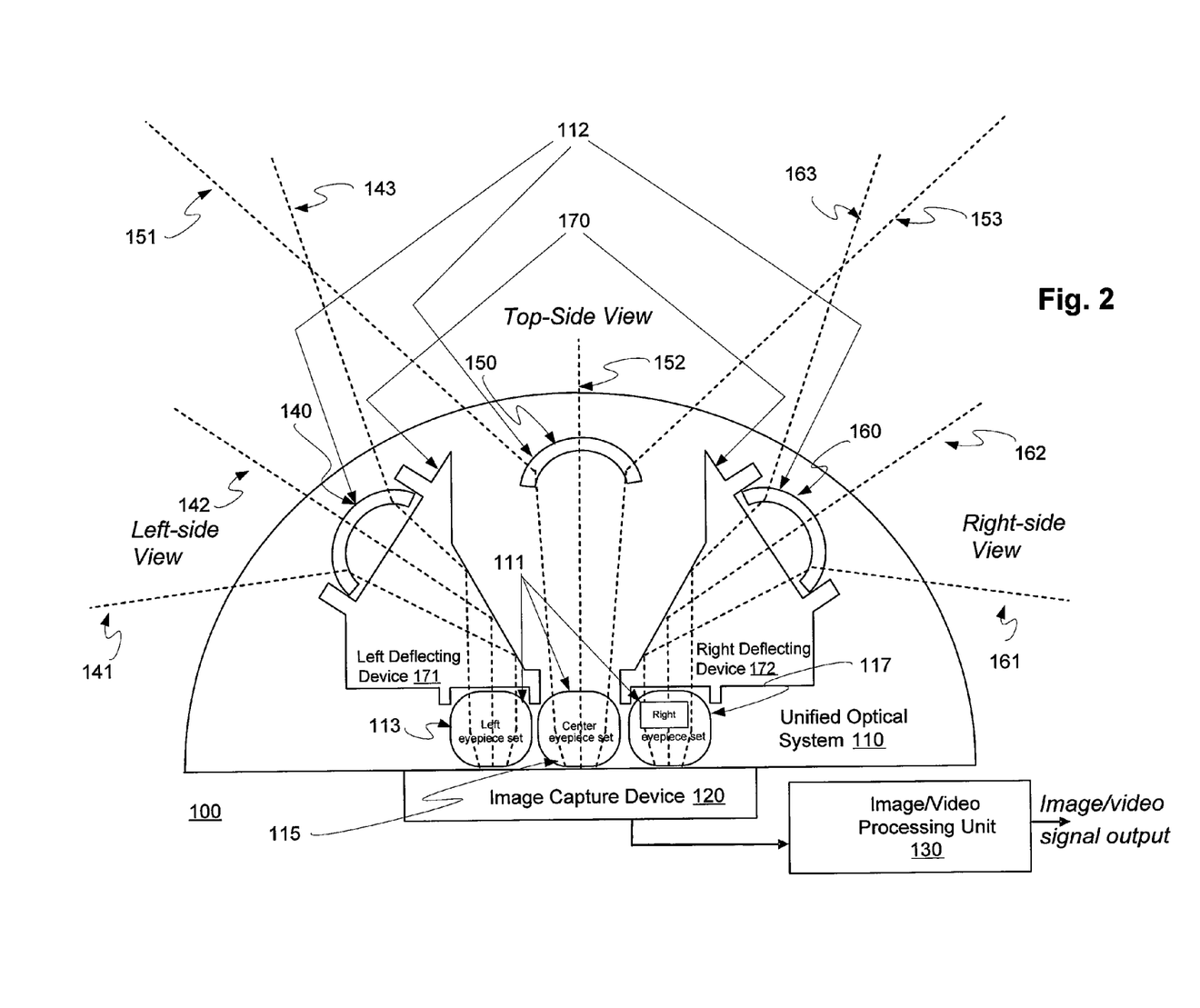
FIG. 2 is a block diagram of an exemplary panoramic camera system consistent with embodiments of the present invention.

FIG. 2 illustrates an exemplary panoramic camera system 100 in which features and principles consistent with the disclosed embodiments may be implemented. As shown in FIG. 2, system 100 may include a unified optical system 110, an image capture device 120, and an image/video processing unit 130.

Unified optical system 110 may be an enclosed device that houses image components that collect and direct images from a target scene for provision to image capture device 120. Image capture device 120 is a device that receives light images directed from unified optical system 110 and stores the light images as image data. Image/video processing unit 130 is a processing unit that executes software that processes the image data collected by image capture device 120 to produce image or video signal data representing a 360 degree view of the target scene monitored by unified optical system 110.

In one embodiment, unified optical system 110 is configured with one or more optical and mechanical materials to house a multi-side deflecting device 170, objective lens sets 112, eyepiece lens sets 111, and an aligned image sensor (not shown). Objective lens sets 112 may include a left objective lens set 140, a center objective lens set 150, a right objective lens set 160, a front objective lens set (not shown in FIG. 2), and a back objective lens set (not shown in FIG. 2). In one embodiment, each lens set within lens sets 112 may be associated with a camera that collects still images of a target scene, such as a digital camera. Alternatively, each lens set within lens set 112 may be associated with a camera that collects moving images from a scene, such as a video camera. In another embodiment, one or more of the lens set within lens sets 112 may be associated with a camera that collects still and/or moving images, such as a digital camera capable of collecting snap shot or video images of a target scene. The disclosed embodiments are not limited to the above described exemplary cameras, and other types of cameras associated with one or more lens sets may be implemented to collect images from a target scene.

In one embodiment, each lens set included in lens sets 112 may include one or more lenses that are configured to direct images from relative views of a target scene to deflecting device 170 for deflection to a corresponding eyepiece set. For instance, as shown in FIG. 2, left objective lens set 140 collects left side images 141, 142, and 143 that are part of a left side view of a target scene. Left objective lens set 140 may be configured to direct the collected left side view images 141, 142, and 143 to deflecting device 170. Similarly, center objective lens set 150 collects images 151, 152, and 153 that are part of a top side view of the target scene and right objective lens set 160 collects images 161, 162, and 163 that are part of a right side view of the target scene.

Figure 3A:
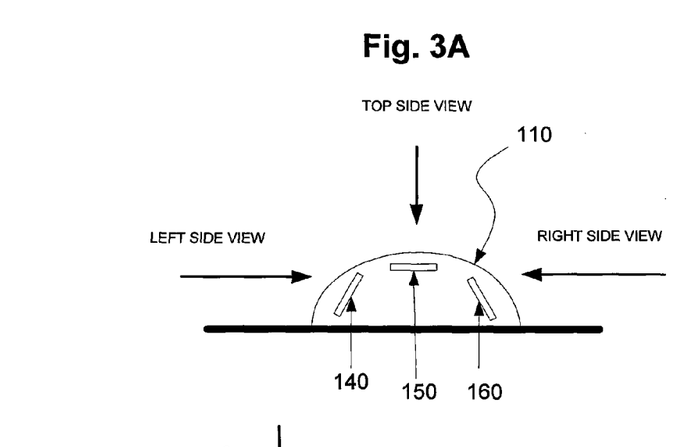
FIGS. 3A-3D are block diagrams of exemplary unified optical systems positioned in different orientations relative to a target scene consistent with embodiments of the present invention.
Figure 3B:
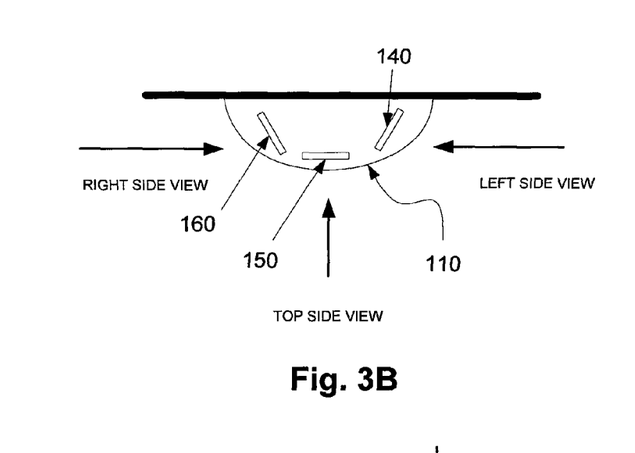
Figure 3C:
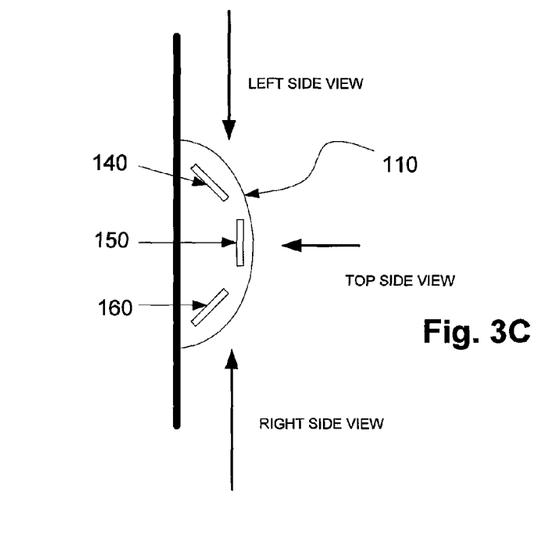
Figure 3D:
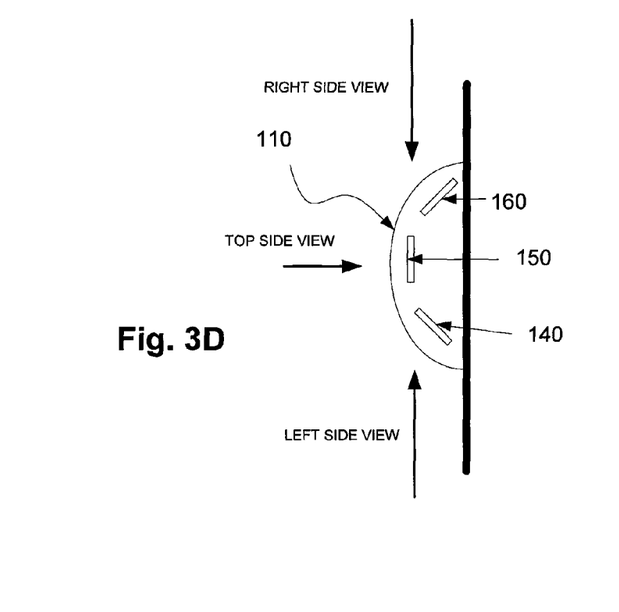

In one embodiment, objective lens sets 112 collect images of the target scene from views that are relative to the orientation of unified optical system 110 to the target scene. Thus, the top side view of the target scene may be taken relative to the position of the center objective lens set of unified optical system 110. Similarly, the left and right side views of the target scene may be taken relative to the position of the left and right objective lens sets, respectively. For example, as shown in FIG. 3A, unified optical system 110 may be oriented such that the top side view of the target scene is positioned above unified optical system 110, such as when unified optical system 110 is positioned on a table for video conferencing applications. FIG. 3B shows an exemplary embodiment where unified optical system 110 is oriented such that the top side view of the target scene is positioned below, such as when unified optical system 110 is positioned on a ceiling for surveillance applications. FIGS. 3C and 3D show exemplary embodiments where unified optical system 110 is positioned such that the top side view of the target scene is on a horizontal plane, such as when unified optical system 110 is positioned on a wall of other form of vertical surface.

Each objective lens set 140, 150, and 160 may be configured to direct collected images from a respective view of the target scene to deflecting device 170 at particular angles such that the images are directed to a respective one of the eyepiece lens sets 111. For instance, left objective lens set 140 may be configured to direct the collected left side view images 141, 142, and 143 to deflecting device 170 at such an angle to cause deflection of the respective images to a left eyepiece set 113. Further, right side objective lens set 160 may be configured to direct the collected right side view images 161, 162, and 163 to deflecting device 170 at such an angle to cause deflection of the respective images to a right eyepiece set 117.

In one embodiment, deflecting device 170 may be formed of one or more deflecting devices. For instance, as shown in FIG. 2, deflecting device 170 may include a left deflecting device 171 and a right deflecting device 172. In this embodiment, left objective lens set 140 may guide images 141, 142, and 143 to left deflecting device 171 for deflection to left eyepiece set 113. Further, right objective eyepiece set 160 may guide images 161, 162, and 163 to right deflecting device 172 for deflection to right eyepiece set 117. Moreover, in one embodiment, center objective lens set 150 may be configured to direct the collected top side view images 151, 152, and 153 directly to a center eyepiece set 115 without manipulation by deflecting device 170.

In one embodiment, deflecting device 170 may be a single device having a hollow center or is configured with multiple deflecting devices such that it provides an unobstructed view between center objective lens set 150 and center eyepiece set 115, to allow center objective lens set 150 to directly guide images 151, 152, and 153 to center eyepiece set 115. Alternatively, center objective lens set 150 may be configured to deflect the collected top side view images 151, 152, and 153 deflecting device 170 at such an angle to cause deflection of the respective images to center eyepiece set 115.

In one embodiment, deflecting device 170 may include a prism. Thus, in one aspect, left deflecting device 171 and right deflecting device 172 may include prisms that refract and deflect images. For instance, left and right deflecting devices 171 and 172 may be configured such that light refracted by a respective objective lens set is further refracted and subsequently deflected to a corresponding eyepiece set. For instance, left objective lens set 140 may refract image 143 to left deflecting device 171, which further refracts image 143 to an opposite side of the left deflecting device 171, where the image is deflected to left eyepiece 113. In one embodiment, left and right deflecting devices 171 and 172 may be configured to guide images that each have an incident angle that depends on a deflection angle of the image directed to a corresponding eyepiece set. In another embodiment, left and right deflecting devices 171 and 172 may be configured to receive a refracted image from a corresponding objective lens set and deflect the image to a respective eyepiece lens set without further refracting the image upon entry into the deflecting device. For instance, left objective lens set 140 may refract image 143 such that the image is guided directly to the opposite side of left deflecting device 171 for deflection to left eyepiece set 113. In another embodiment, deflecting device 170 may also include front and back deflecting devices (not shown) that deflect front and back side images to respective eyepiece lens sets.

Figure 4:
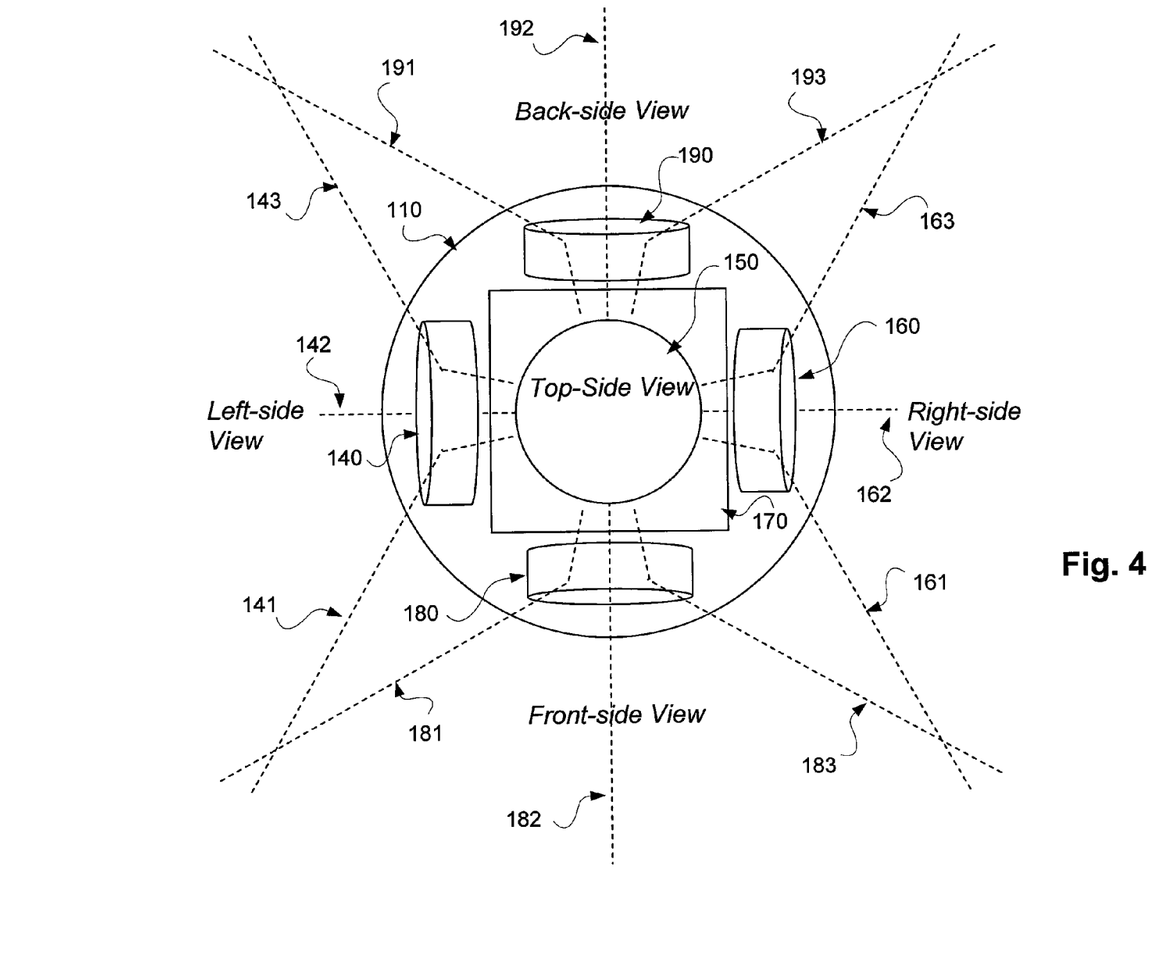
FIG. 4 is a block diagram of a top side view of an exemplary panoramic camera system consistent with embodiments of the present invention.

FIG. 4 shows a block diagram of the exemplary panoramic camera system 100 from a top side down view. From this view, FIG. 4 illustrates the front objective lens set 180 and back objective lens set 190 included but not shown in the exemplary panoramic camera system 100 of FIG. 2. Front objective lens set 180 collects front side images 181, 182, and 183 that are part of a front side view of the target scene. Back objective lens set 190 collects back side images 191, 192, 193 that are part of a back side view of the target scene. Also, objective lens sets 180 and 190 may each be configured to direct collected images from their respective views of the target scene to deflecting device 170 at particular angles such that the images are directed to a respective one of the eyepiece lens sets 111. For instance, front objective lens set 180 may be configured to direct the collected front side view images 181, 182, and 183 to deflecting device 170 for deflection of the images to a front eyepiece set (not shown). Similarly, back objective lens set 190 may be configured to direct the collected back side view images 191, 192, and 193 to deflecting device 170 for deflection to a back eyepiece set (not shown). In one embodiment deflecting device 170 includes a front deflecting device (not shown) that deflects images 181, 182, and 183 to the front eyepiece lens set and a back deflecting device (not shown) that deflects images 191, 192, and 193 to the back eyepiece lens set.

As shown in FIGS. 2 and 4, the objective lens sets 140, 150, 160, 180, and 190 receive images in an overlapping manner. Further, one of ordinary skill in the art would understand that each objective lens set 140, 150, 160, 180, and 190 is configured to collect all light images within a viewing range of the respective objective lens set. For example, while FIG. 2 shows left objective lens set collecting three left side images 141, 142, and 143, it is understood that left objective lens set 140 is configured to collect all images from the left side view of the target scene that are within the range between left side image 141 and left side image 143. Moreover, in one embodiment, the horizontal objective lens sets (e.g., lens sets 140, 160, 180, and 190) may each capture a 108 degree field of view, or the like, such that each lens set overlaps with the field of view of an adjacent lens set.

Figure 5:
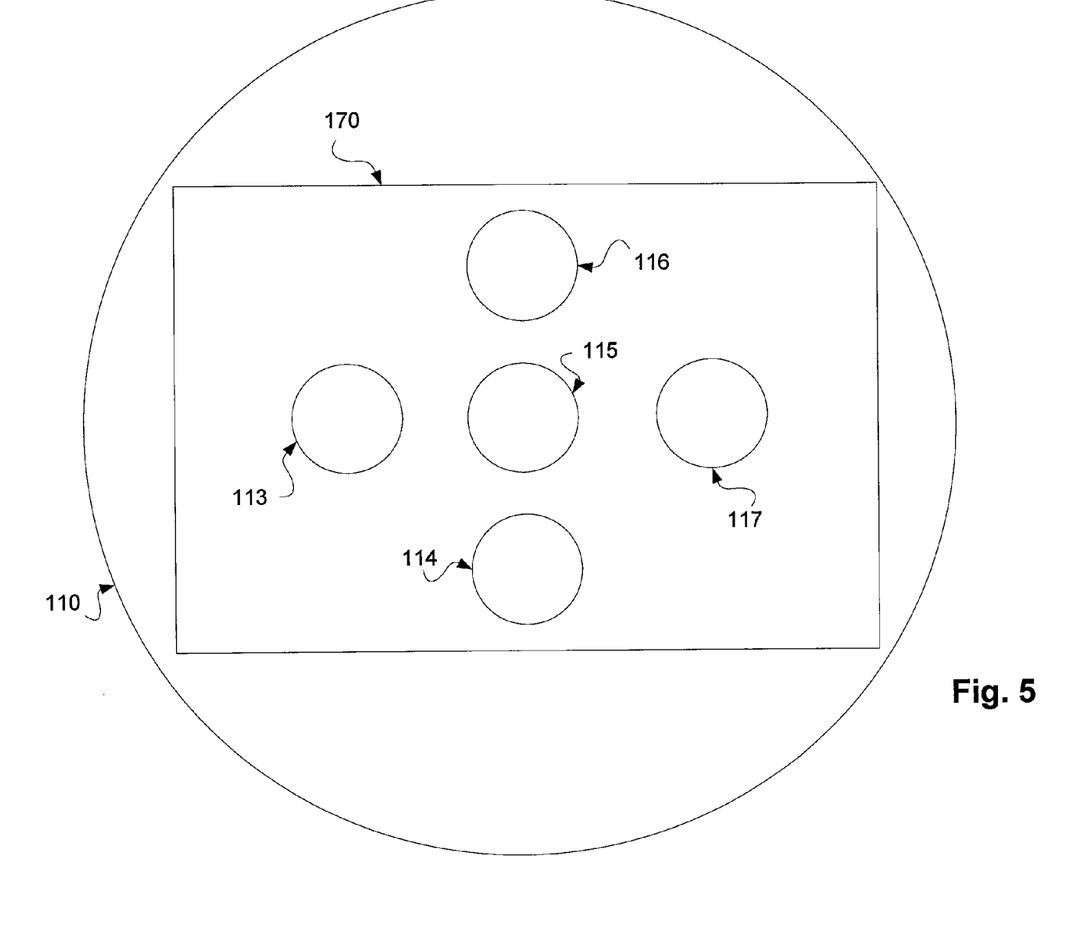
FIG. 5 is a block diagram of a bottom side view of an exemplary panoramic camera system consistent with embodiments of the present invention.

FIG. 5 shows a block diagram of a bottom side view of the exemplary panoramic camera system 100 consistent with the disclosed embodiments. The view illustrated in FIG. 5 shows the eyepiece sets 111 that may be implemented in panoramic camera system 100 in accordance with one embodiment of the invention. For instance, FIG. 5 shows left eyepiece set 113, center eyepiece set 115, right eyepiece set 117, front eyepiece set 114, and back eyepiece set 116. As mentioned above, each eyepiece set 113, 115, 117, 114, and 116 receives images deflected from deflecting device 170 from objective lens sets 140, 150, 160, 180, and 190, respectively. Each eyepiece set 113, 114, 115, 116, and 117 may include one or more lenses that are configured to focus respective images received from deflecting device 170 to image capture device 120.

In operation, the unified optical system 110 provides a mechanism for focusing light images from directions of a target scene to image capture device 120 with little optical distortion from each view. For instance, in one embodiment, light coming from four horizontal directions of the target scene (e.g., the left, right, front, and back views) is guided by the left, right, front, and back objective lens sets 140, 160, 180, 190 to deflecting device 170. Deflecting device 170 deflects the light from these four horizontal objective lens sets to corresponding eyepiece sets 113, 114, 116, and 117. Each eyepiece set 113, 114, 116, and 117 projects the respective light deflected by deflecting device 170 to four different areas on image capture device 120. Further, light coming from the top side of the target scene is guided by the center objective lens set 150 to deflecting device 170, which deflects the top side light to center eyepiece set 115. Center eyepiece set 115 focuses and projects the top side light to a middle area of image capture device 120.

In one embodiment, image capture device 120 may be an image capture sensor that synchronously captures images provided by objective lens sets 112 via eyepiece lens sets 111. For instance, image capture device 120 may be an image sensor microchip or similar device that collects the images guided by eyepiece lens sets 111 in a synchronous manner (e.g., collects images from at least two different eyepiece lens sets 113, 114, 115, 116, and 117 at or near the same time). In one aspect, this embodiment avoids image capturing problems associated with implementing image capture sensors at the cameras associated with objective lens sets that capture images at different speeds.

Figure 6:
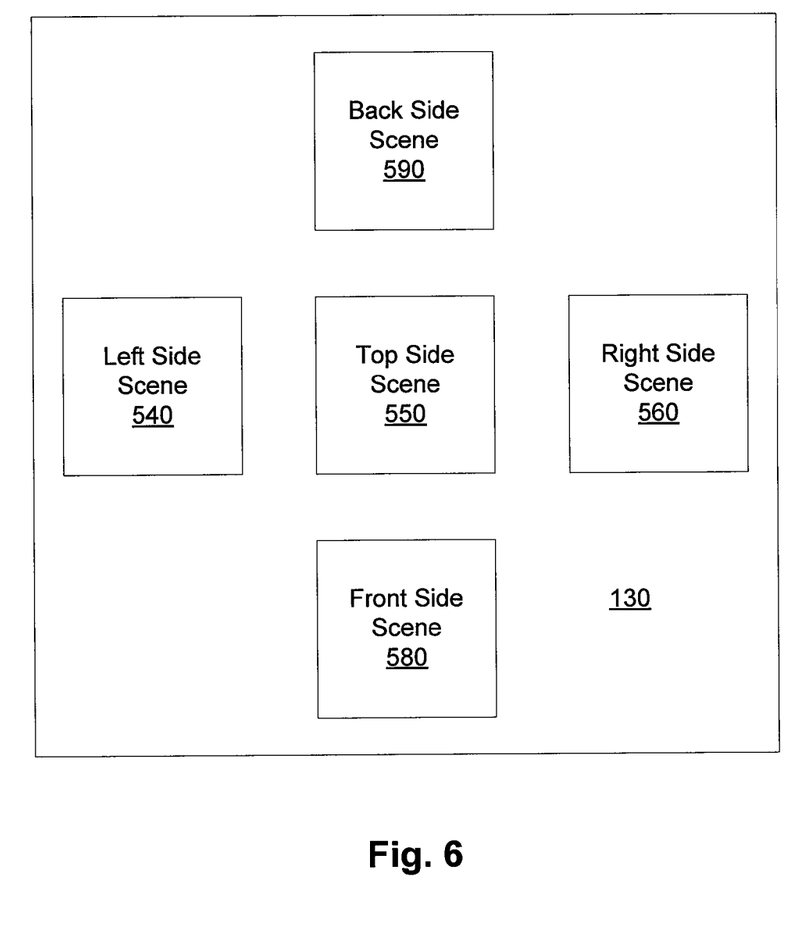
FIG. 6 is a block diagram of exemplary sub-images that may be provided on an image capture device consistent with embodiments of the present invention.

FIG. 6 shows a block diagram of an exemplary image capture device 120 including projected sub-images consistent with the disclosed embodiments. As shown, image capture device 120 includes a left side scene 540, a top side scene 550, a right side scene 560, a front side scene 580, and a back side scene 590. Left side scene 540 represents the sub-image produced by the left side light projected by left eyepiece set 113. Top side scene 550 represents the sub-image produced by the top side light projected by center eyepiece set 115. Right side scene 560 represents the sub-image produced by the right side light projected by right eyepiece set 117. Front side scene 580 represents the sub-image produced by the front side light projected by front eyepiece set 114. Back side scene 590 represents the sub-image produced by the back side light produced by back eyepiece set 116.

Collectively, the sub-images included in scenes 540, 550, 560, 580, and 590 constitute images of the target scene collected from five different views: left, top, right, front, and back. And because each objective lens set 140, 150, 160, 180, and 190 receives light images that overlap with images received from at least one adjacent objective lens set, scenes 540, 550, 560, 580, and 590 provide sub-images that are conducive to accurate image processing by image/video processing unit 130. For instance, in one embodiment, image/video processing unit 130 processes the sub-images by stitching the sub-images together into a panoramic image. Additionally, or alternatively, image/video processing unit 130 may process the sub-images by accumulating the sub-images into a panoramic video. Image/video processing unit 130 may then output image or video signals for further display, storage, processing, inspection or any other use for such signals.

Figure 7:
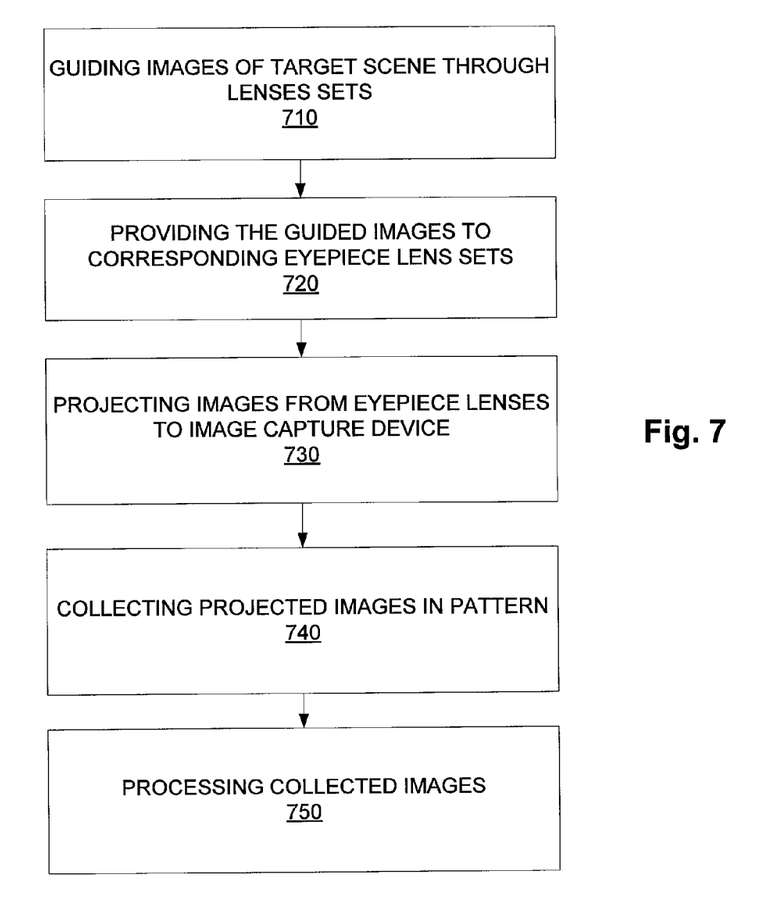
FIG. 7 is a flowchart of an exemplary process for providing a panoramic image of a target scene consistent with embodiments of the present invention.

FIG. 7 shows a flowchart of an exemplary process for providing a panoramic image of a target scene consistent with embodiments of the present invention. In one embodiment, the process may include guiding images of a target scene from different directions through objective lens sets 112 (step 710). In one aspect, each of the horizontal objective lens sets included in lens sets 112 (e.g., left, right, back, and front objective lens sets 140, 160, 180, and 190, respectively) may guide images to deflecting device 170. In another embodiment, step 710 may include guiding images from the top side direction of the target scene to deflecting device 170 via center objective lens set 150. Alternatively, step 710 may include guiding top side images by center objective lens set 150 without manipulation from deflecting device 170, such as that shown in FIG. 2.

In step 720, the process continues with providing the guided images to corresponding eyepiece lens sets 113, 115, 117, 114, and 116. In one embodiment, deflecting device 170 provides the guided images by deflecting them to a corresponding eyepiece lens set in lens sets 111. For instance, deflecting device 170 may deflect: left side images guided by left objective lens set 140 to left eyepiece lens set 113, right side images guided by right objective lens set 160 to right eyepiece lens set 117, back side images guided by back objective lens set 190 to back eyepiece lens set 116, and front side images guided by front objective lens set 180 to front eyepiece lens set 114. In another embodiment, providing the guided images in step 720 may include providing the top side images guided by center objective lens set 150 to center eyepiece lens set 115 without manipulation by deflecting device 170.

In step 730, eyepiece lens sets 113, 114, 115, 116, and 117 may focus and project the images provided in step 720. Image capture device 120 may collect the projected images in a determined pattern (step 740). In one embodiment, the pattern may be determined based on an arrangement of eyepiece lens sets 111. For example, image capture device may collect the projected images in a pattern similar to that described above in connection with FIG. 5.

Once the projected images are collected by image capture device 120, processing unit 130 may process the collected images to produce image and/or video signals representing a panoramic image of the target scene (step 750). In one embodiment, processing the collected images in step 750 may include stitching together the collected images, which include overlapping images from different views, such as, for example, images from the left side view that overlap some images from the front, back, and top side views.

As disclosed, the disclosed embodiments provide a panoramic camera system 100 that is configured to collect images from multiple views of a target scene using image capture device 120 that provides overlapped images to image/video processing unit 130 for image processing. Through objective lens sets 112 that are configured and positioned to direct overlapped images of a target scene to corresponding eyepiece sets 111 by way of deflecting device 170, the disclosed embodiments provide a mechanism for producing a clear and accurate panoramic degree image of the target scene, such as a 360 degree view.

The disclosed embodiments may be implemented using various types of components. For instance, image/video processing device 130 may implement known microprocessors, digital signal processors, and related software or firmware to perform known image processing processes for stitching, correcting, and accumulating image data and for producing image and/or video signals. Further, different types of materials may be used for certain components to provide a panoramic camera system consistent with the embodiments of the invention. For example, deflecting device 170 may be configured from any type of material that directs images from objective lens sets 112. One of ordinary skill in the art would understand that the shape of deflecting device may be adjusted to provide for clear and accurate deflection of the images to corresponding eyepiece sets 111.

Moreover, the disclosed embodiments may provide image and/or video signals for a number of different applications. Accordingly, one of ordinary skill in the art would understand that the image and/or video signals generated by image/video processing unit 130 may be connected to, and communicate with, one or more systems that further process the signals for rendition, display, analysis, testing, storage, transmission, and any other type of use for panoramic images. For instance, the image and/or video signals produced by image/video processor 130 may be used for displaying or storing still or video panoramic images for consumer or professional applications, such as, but not limited to, consumer or professional photography (e.g., artistic expressions, journalism, education, etc.), computer network content presentment, surveillance, video conferencing, video/cinema entertainment, and the like.

Additionally, it is understood that the size, shape, type, and/or configuration of each objective lens set 140, 150, 160, 180, and 190 may determine how much image data is collected to deflecting device 170. For instance, by implementing different types of lenses for one or more of objective lens sets 112, embodiments of the invention may reduce or eliminate blind spots and allow more image information to be directed to deflecting device 170.

Other embodiments of the invention will be apparent to those skilled in the art from consideration of the specification and practice of the disclosed embodiments. It is intended that the specification and examples be considered as exemplary only, with a true scope and spirit of the invention being indicated by the following claims.

What is claimed is:

1. A panoramic camera system, comprising:
a unified optical system including:
a first set of lenses that guides images received from horizontal directions of a target scene that surrounds the unified optical system in a 360 degree field of view,
a deflecting device that deflects the images guided through the first set of lenses, and
a second set of lenses that projects the images deflected by the deflecting device;
an image capture device that collects the projected images into a determined pattern based on the second set of lenses; and
a processing unit that processes the collected images from the image capture device to generate at least one of image signals and video signals representing a panoramic rendition of the target scene;
wherein the first set of lenses includes a first lens that guides images from a first horizontal field of view of the target scene, and wherein the deflecting device deflects the images guided by the first lens to a second lens included in the second set of lenses, and
wherein the first set of lenses further guides images received from a top side direction of the target scene that surrounds the unified optical system and wherein the first set of lenses includes a third lens that guides images from the top side field of view of the target scene to a fourth lens included in the second set of lenses without manipulation by the deflecting device.

2. The panoramic camera system of claim 1, wherein the first set of lenses further guides images received from a top side direction of the target scene that surrounds the unified optical system.

3. The panoramic camera system of claim 1, wherein the pattern of projected images collected by the image capture device includes a first set of scenes representing images corresponding to the horizontal directions of the target scene, wherein the first set of scenes are located in determined positions on the image capture device.

4. The panoramic camera system of claim 2, wherein the pattern of projected images collected by the image capture device includes a first set of scenes representing images corresponding to the horizontal directions of the target scene and a second scene that represents images corresponding to the top side direction of the target scene, wherein the second scene is positioned in the middle of the first set of scenes on the image capture device.

5. The panoramic camera system of claim 1, wherein the first set of lenses include lenses that receive images from different fields of view in an overlapping manner such that at least one of the first set of lenses receives images that overlap with images received by another of the first set of lenses.

6. A panoramic camera system, comprising:
a unified optical system including:
a first set of lenses that guides images received from horizontal directions of a target scene that surrounds the unified optical system in a 360 degree field of view,
a deflecting device that deflects the images guided through the first set of lenses, and
a second set of lenses that projects the images deflected by the deflecting device;
an image capture device that collects the projected images into a determined pattern based on the second set of lenses; and
a processing unit that processes the collected images from the image capture device to generate at least one of image signals and video signals representing a panoramic rendition of the target scene;
wherein the first set of lenses include a left lens set that receives left side images from a left side view of the target scene, a right lens set that receives right side images from a right side view of the target scene, a front lens set that receives front side images from a front side view of the target scene, and a back lens set that receives back side images from a back side view of the target scene.

7. The panoramic camera system of claim 6, wherein the first set of lenses further includes a center lens set that receives top side images from a top side view of the target scene.

8. The panoramic camera system of claim 6, wherein a portion of the left side images and a portion of the right side images each overlap with at least one of a portion of the front side images and a portion of the back side images.

9. The panoramic camera system of claim 7, wherein a portion of the left side images and a portion of the right side images each overlap with at least one of a portion of the front side images and a portion of the back side images, and wherein a portion of the top side images overlap with at least one of a portion of the right side images, a portion of the left side images, a portion of the front side images, and a portion of the back side images.

10. The panoramic camera system of claim 6, wherein the deflecting device deflects the left side, right side, back side, and front side images to the second set of lenses, and wherein the second set of lenses include at least one of:
a left eyepiece lens set that focuses the left side images onto the image capture device,
a right eyepiece lens set that focuses the right side images onto the image capture device,
a front eyepiece lens set that focuses the front side images onto the image capture device, and
a back eyepiece lens set that focuses the back side images onto the image capture device.

11. The panoramic camera system of claim 7, wherein the deflecting device deflects the left side, right side, back side, and front side images to the second set of lenses, and wherein the second set of lenses include at least one of:

a left eyepiece lens set that focuses the left side images onto the image capture device, a right eyepiece lens set that focuses the right side images onto the image capture device, a front eyepiece lens set that focuses the front side images onto the image capture device, a back eyepiece lens set that focuses the back side images onto the image capture device, and a center eyepiece lens set that focuses the top side images onto the image capture device.

12. The panoramic camera system of claim 10, wherein the image capture device collects the left side, right side, front side, and back side images focused by the eyepiece lens sets to form a pattern of overlapping images representing a panoramic view of the target scene.

13. The panoramic camera system of claim 11, wherein the image capture device collects the left side, right side, front side, back side, and top side images focused by the eyepiece lens sets to form a pattern of overlapping images representing a panoramic view of the target scene.

14. The panoramic camera system of claim 13, wherein the pattern formed on the image capture device includes the top side images positioned in a middle scan scene surround by left, right, front, and back scan scenes respectively corresponding to the left side, right side, front side, and back side images.

15. The panoramic camera system of claim 1, wherein the panoramic camera system is one of a surveillance camera system, a video conferencing camera system, and a digital camera system.

16. The panoramic camera system of claim 1, wherein the image capture device synchronously collects the projected images from the horizontal directions into the determined pattern.

17. The panoramic camera system of claim 2, wherein the image capture device synchronously collects the projected images from the horizontal and top-side directions into the determined pattern.

18. An optical system for a panoramic camera system, comprising:

a first set of lenses arranged to guide images from different directions of a target scene such that the first set of lenses guide images from a 360 degree field of view of the target scene;

a deflecting device that deflects the guided images from the different directions in a downward direction; and a second set of lenses configured to receive the deflected images from the deflecting device and to project the deflected images to an image capture device in a pattern based on an arrangement of the second set of lenses;

wherein the first set of lenses includes a set of horizontal lenses that guide images from different horizontal directions of the target scene and at least one center lens that guides images from a to side direction of the target scene, and wherein the second set of lenses includes:

a set of horizontal eyepiece lenses that receive the deflected images from the set of horizontal lenses through the deflecting device, and at least one center eyepiece lens that receives the deflected images from the at least one center lens.

19. The optical system of claim 18, wherein the set of horizontal eyepiece lenses include eyepiece lenses that are configured to receive images guided by dedicated ones of the horizontal lenses.

20. The optical system of claim 18, wherein the pattern of projected images includes a set of horizontal scenes representing images of the target scene from different horizontal directions and a center scene representing images of the target scene from the top side view, wherein the center scene is projected in the middle of the set of horizontal scenes.

21. The optical system of claim 18, wherein the first set of lenses guide images in an overlapping manner such that adjacent lens sets in the first set of lenses guide a portion of the same images of the target scene to the deflecting device.

22. A panoramic imaging system, comprising:

first means for guiding images from different directions of a target scene, such images being guided from a 360 degree field of view of the target scene;

deflecting means for deflecting the images guided by the first means;

second means for projecting the images deflected by the deflecting means;

third means for collecting the projected images into a determined pattern based on the second means; and fourth means for processing the collected images from the third means to generate at least one of image signals and video signals representing a panoramic rendition of the target scene, wherein the first means includes a set of horizontal lenses that guide images from different horizontal directions of the target scene and at least one center lens that guides images from a top side direction of the target scene, and wherein the second means further includes a set of horizontal eyepiece lenses that receive the deflected images from the deflecting means, and wherein the set of horizontal eyepiece lenses include lenses that are configured to receive images guided by dedicated ones of the horizontal lenses and the center eyepiece lens is configured to receive images guided by the at least one center lens.

23. The panoramic image system of claim 22, wherein the second means include a set of lenses that are each configured to project images guided by the first means from a respective direction of the target scene, and wherein the determined pattern is formed by the third means based on the image directions of the target scene.

24. A method for providing a panoramic image of a target scene that surrounds a panoramic camera system in a 360 degree field of view, comprising:

guiding images received from horizontal directions of the target scene through a set of horizontal lenses;

providing the guided images to a set of eyepiece lenses;

projecting the guided images through a set of eyepiece lenses to an image capture device;

synchronously collecting the projected images into a determined pattern on the image capture device based on the set of eyepiece lenses; and processing the collected images to generate at least one of image signals and video signals representing a panoramic rendition of the target scene, wherein guiding the images from horizontal directions includes guiding the images from a first horizontal field of view of the target scene, and wherein providing the guided images includes deflecting the images from the first horizontal field of view to a particular lens included in the set of eyepiece lenses by way of a deflecting device.

25. The method of claim 24, further including guiding images received from a top side direction of the target scene through a center lens.

26. The method of claim 25, wherein guiding the images from the top side direction includes at least one of:

guiding the images from the top side direction directly to a second particular lens included in the set of eyepiece lenses.

27. The method of claim 25, wherein synchronously collecting the projected images into a determined pattern includes:
  synchronously collecting the projected images into a pattern of projected images including a first set of scenes representing images corresponding to the horizontal directions of the target scene and a second scene that represents images corresponding to the top side direction of the target scene, wherein the second scene is positioned in the middle of the first set of scenes.

28. The method of claim 24, wherein guiding the images received from horizontal directions of the target scene includes receiving images from different horizontal fields of view in an overlapping manner such that a portion of images guided from a first direction is included in a portion of images guided from a second direction.

* * * * *